(12) United States Patent
Bartlett

(10) Patent No.: US 8,359,438 B2
(45) Date of Patent: Jan. 22, 2013

(54) MEMORY BANKING SYSTEM AND METHOD TO INCREASE MEMORY BANDWIDTH VIA PARALLEL READ AND WRITE OPERATIONS

(75) Inventor: Douglas E. Bartlett, Fort Collins, CO (US)

(73) Assignee: Avago Technologies Enterprise IP (Singapore) Pte. Ltd., Singapore (SG)

( * ) Notice: Subject to any disclaimer, the term of this patent is extended or adjusted under 35 U.S.C. 154(b) by 367 days.

(21) Appl. No.: 12/782,579

(22) Filed: May 18, 2010

(65) Prior Publication Data

US 2011/0289256 A1    Nov. 24, 2011

(51) Int. Cl.
G06F 12/00    (2006.01)
G06F 13/00    (2006.01)
G06F 13/28    (2006.01)

(52) U.S. Cl. ........ 711/150; 711/118; 711/137; 711/151; 711/152

(58) Field of Classification Search .................. 711/118, 711/137, 150–152
See application file for complete search history.

(56) References Cited

U.S. PATENT DOCUMENTS

| | | | |
|---|---|---|---|
| 6,151,664 A | 11/2000 | Borkenhagen et al. | |
| 6,215,497 B1 | 4/2001 | Leung | |
| 6,757,784 B2 | 6/2004 | Lu et al. | |
| 2003/0163643 A1* | 8/2003 | Riedlinger et al. | 711/131 |
| 2009/0080280 A1 | 3/2009 | Boucard et al. | |
| 2010/0161892 A1* | 6/2010 | Dama et al. | 711/104 |

OTHER PUBLICATIONS

Zhang et al., "Design and Optimization of Large Size and Low Overhead Off-Chip Caches," IEEE Transactions on Computers, vol. 53, No. 7, Jul. 2004, pp. 843-855.

* cited by examiner

Primary Examiner — Christian P Chace
Assistant Examiner — Ryan Bertram

(57) ABSTRACT

A cache memory and a tag memory are included in a banked memory system and used to effectively enable parallel write and read operations on each clock cycle, even though the memory banks consist of single-port devices that are not inherently capable of parallel write and read operations.

15 Claims, 5 Drawing Sheets

| BANK CONFLICT | READ INDEX HIT | WRITE INDEX HIT | WRITE INDEX OCCUPIED | READ DATA FROM: | WRITE DATA TO: | CACHE DATA WRITEBACK | TAG UPDATE |
|---|---|---|---|---|---|---|---|
| 0 | 0 | 0 | X | BANK | BANK | <NONE> | <UNCHANGED> |
| 1 | 0 | 0 | 0 | BANK | CACHE | <NONE> | BANK NUMBER; VALID BIT = 1 |
| 1 | 0 | 0 | 1 | BANK | CACHE | OLD CACHE CONTENTS | BANK NUMBER; VALID BIT = 1 |
| X | 0 | 1 | X | BANK | CACHE | <NONE> | <UNCHANGED> |
| X | 1 | 0 | X | CACHE | BANK | <NONE> | <UNCHANGED> |
| X | 1 | 1 | X | CACHE | BANK | <NONE> | VALID BIT = 0 |

"1" = logic-"1", high, true, etc.
"0" = logic-"0", low, false, etc.
"X" = "Don't Care," irrelevant, etc.

FIG. 3

| CLOCK CYCLE N | CLOCK CYCLE N+1 | CLOCK CYCLE N+2 | ... |
|---|---|---|---|
| - READ TAGS FOR READ AND WRITE ADDRESSES AND STORE TEMPORARILY<br>- READ CACHE AND STORE TEMPORARILY<br>- MEMORY LOGIC OPERATES; MEMORY CONTROLLER OUTPUTS SIGNALS TO MEMORY DEVICES | - READ BANK OR CACHE<br>- WRITE BANK OR CACHE<br>- WRITEBACK BANK (IF REQUIRED)<br>- WRITE TAG UPDATE (IF REQUIRED) | - PRESENT READ DATA TO READ PROCESS | ... |
| | - READ TAGS FOR READ AND WRITE ADDRESSES AND STORE TEMPORARILY<br>- READ CACHE AND STORE TEMPORARILY<br>- MEMORY LOGIC OPERATES; MEMORY CONTROLLER OUTPUTS SIGNALS TO MEMORY DEVICES | - READ BANK OR CACHE<br>- WRITE BANK OR CACHE<br>- WRITEBACK BANK (IF REQUIRED)<br>- WRITE TAG UPDATE (IF REQUIRED) | ... |
| | | - READ TAGS FOR READ AND WRITE ADDRESSES AND STORE TEMPORARILY<br>- READ CACHE AND STORE TEMPORARILY<br>- MEMORY LOGIC OPERATES; MEMORY CONTROLLER OUTPUTS SIGNALS TO MEMORY DEVICES | ... |

FIG. 4

MEMORY BANKING SYSTEM AND METHOD TO INCREASE MEMORY BANDWIDTH VIA PARALLEL READ AND WRITE OPERATIONS

BACKGROUND

It is desirable to provide certain types of application-specific integrated circuits (ASICs) with significant memory capability, including some combination of large amounts of memory, high operating speed, and high bandwidth. Providing such capability can be problematic. Memory occupies space and consumes power. In an ASIC, it is desirable to conserve space and power resources. A variety of factors place practical limits upon clock speed. Therefore, other avenues for enhancing memory performance may be preferable to simply increasing clock speed. One potential way to increase the amount of memory that is effectively available to an ASIC without actually adding memory to the ASIC design or increasing clock speed is to provide external, i.e., off-chip, memory. However, to provide a significant increase in memory bandwidth, such off-chip solutions generally must consume substantial amounts of power and tie up a substantial number of ASIC input/output (I/O) pins. It would be desirable to effectively increase memory bandwidth without unduly increasing memory quantity or clock speed in the ASIC or resorting to off-chip solutions.

It is known that some aspects of memory performance can be enhanced by dividing physical memory into logical data storage units known as memory banks. Memory banking schemes can be employed in a parallel processing system to allow two or more processes to simultaneously access the data storage. For example, in a memory banked system, a first process may be able to read a memory location in a first memory bank at the same time that a second process is able to write to a memory location in a second memory bank. Dividing the memory into banks reduces the likelihood that two processes will attempt to simultaneously access the same bank, thereby effectively increasing bandwidth. However, for memory banking to work properly, the system must provide some means for solving potential bank conflicts where a first process attempts to simultaneously access the same bank as the second process. One known solution to this potential problem is for the system to space the two memory accesses so that they occur sequentially rather than simultaneously.

Dual-port memory is a type of memory device that allows simultaneous read and write access by two processes during a single clock cycle. That is, during a single clock cycle, a first process can write to or read from the memory while a second process can, independently of the first process, write to or read from the same memory device. However, dual-port memory is relatively uneconomical compared with single-port memory and occupies significantly more space on an ASIC or other integrated circuit chip than single-port memory. It is also known to enhance a single-port memory system by increasing (e.g., doubling) the clock speed to allow a read operation and a write operation to occur sequentially but within a single clock cycle of one another, thereby providing an effect that approaches the simultaneity of true dual-port memory.

SUMMARY

Embodiments of the present invention relate to a memory system and method in which a cache memory is used with a plurality of memory banks, each comprising one or more single-port memory devices, to effectively enable parallel write and read operations. The system also includes a tag memory that stores information about the contents of the cache memory.

The system processes both a read request and a write request on each of a plurality of successive clock cycles. A write bank, which indicates which memory bank corresponds to the write address, is determined in response to the write address. Likewise, a read bank, which indicates which memory bank corresponds to the read address, is determined in response to the read address. The system further determines whether a bank conflict exists between the read bank and the write bank. That is, a bank conflict exists if the read bank and the write bank are the same as each other. The system also reads the tag memory to determine if data corresponding to the read address or write address exists in the cache memory.

Once the system has made these determinations using the read and write addresses, the system performs a memory access operation, i.e., either a write operation or a read operation, which can utilize the cache memory. The memory access operation is performed upon a storage location in the cache memory if either a bank conflict exists or data corresponding to one of the read address and write address exists in the cache memory. The clock cycle during which the system performs this memory access operation can be referred to as a memory access clock cycle. Although the memory access operation that can utilize the cache memory is either a write operation or a read operation, both a write operation and a read operation are performed during each memory access clock cycle.

In an instance in which a write operation is performed upon the cache memory, the system can update the tag memory to indicate the presence of new data in the cache memory. Under certain circumstances, such as in an embodiment in which a write operation can overwrite data already in the cache memory with the same data (i.e., data corresponding to the write address was present in the cache memory prior to the write operation), the system need not update the tag memory. Once updated, the tag memory indicates that data exists in a storage location in the cache memory corresponding to the write address.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 3 is a truth table for the memory logic of FIG. 2.

FIG. 4 is a timing diagram showing the pipelining of operations in accordance with the exemplary embodiment.

DETAILED DESCRIPTION

Figure 1:
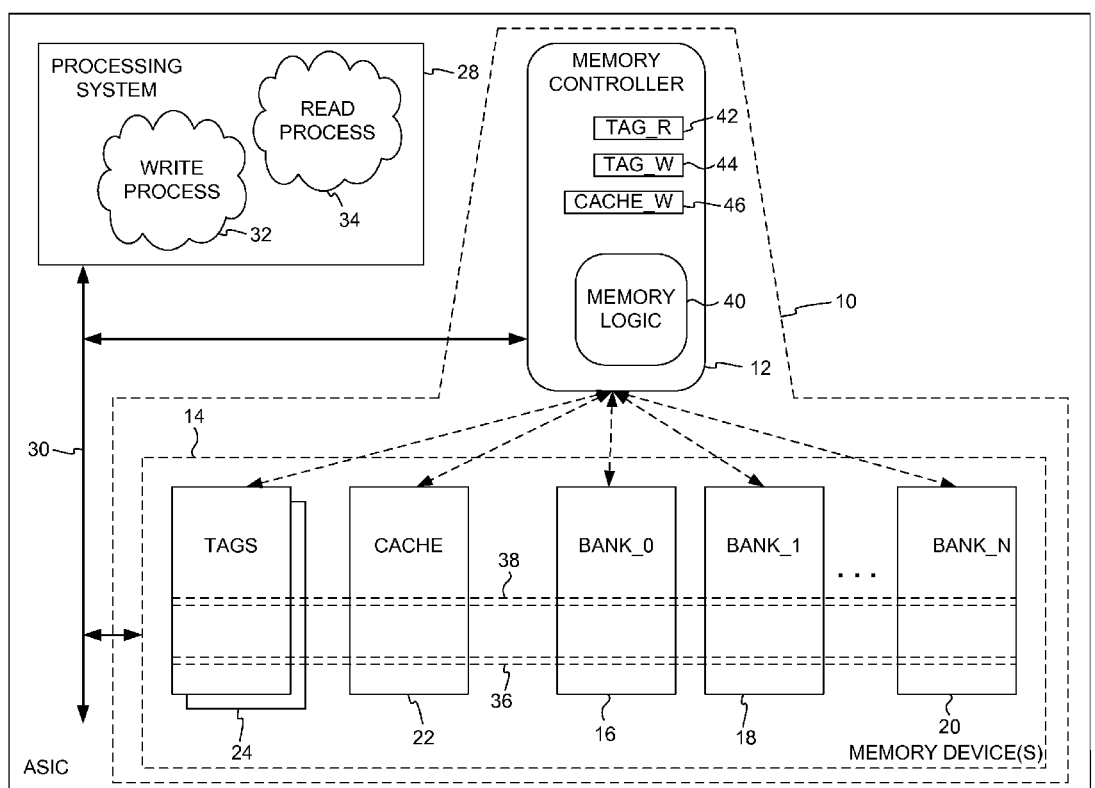
FIG. 1 is a block diagram of an ASIC that includes a memory system in accordance with an exemplary embodiment of the invention.

As illustrated in FIG. 1, in an illustrative or exemplary embodiment of the invention, a memory system 10 includes a memory controller 12 and memory devices 14. Memory devices 14 include a plurality of memory banks 16, 18, 20, etc. (There can be any number of two or more memory banks, some of which are not shown in FIG. 1 for purposes of clarity but are indicated by the ellipsis (" . . . ") symbol.) Memory devices 14 also include a cache memory 22 and a tag memory 24. Memory devices 14 are actual or physical devices, while memory banks 16, 18, 20, etc., cache memory 22, and tag memory 24 are logical groups of memory devices 14 that can be operated independently of other such logical groups of memory devices 14.

Each of memory banks 16, 18, 20, etc., consists of one or more single-port memory devices or similar memory devices. As well understood in the art, such a memory device is not inherently capable of being read from and written to simultaneously, i.e., in parallel or on the same clock cycle. In contrast, cache memory 22 and tag memory 24 can be read from and written to simultaneously, i.e., on the same clock cycle. For example, cache memory 22 can comprise one or more dual-port memory devices or similar memory devices. As well understood in the art, a dual-port memory device is inherently capable of being read from and written to simultaneously. Tag memory 24 can similarly comprise one or more dual-port memory devices. Alternatively, tag memory 24 can comprise one or more single-port memory devices that are operated at twice the clock speed at which memory banks 16, 18, 20, etc., are operated, which effectively enables them to be read from and written to simultaneously with respect to the rest of memory system 10. In the exemplary embodiment, tag memory 24 comprises two portions that operate in parallel with each other in an identical manner as each other, i.e., with the same information stored redundantly in each, so that information needed for a read operation and information needed for a write operation can be utilized on the same clock cycle. For purposes of clarity, tag memory 24 is referred to herein in the singular rather than the plural ("tag memories") even though it comprises dual tag memories in the exemplary embodiment.

In the exemplary embodiment, memory system 10 is included as part of an application-specific integrated circuit (ASIC) 26. Accordingly, the elements of memory system 10 that are described herein can be provided in accordance with ASIC design and fabrication techniques that are well understood by persons skilled in the art and therefore not described herein. It can be noted that the result of such ASIC design and fabrication techniques is that the elements of memory system 10 are formed upon on a semiconductor substrate and otherwise have the well-understood characteristics of devices formed in an integrated circuit chip. Although in the exemplary embodiment memory system 10 is included as part of ASIC 26, in other embodiments such a memory system can be included as part of any other type of device or other system.

Memory controller 12 generates all of the signals necessary to perform read and write operations upon memory devices 14, such as address signals, data signals, and control signals. As such signals and the manner in which they can be generated (e.g., logic circuitry) are well understood in the art, these details are not described herein. Memory controller 12 operates in response to a processing system 28, which can also be included in ASIC 26 or, in other embodiments, externally to ASIC 26 or other system in which memory system 10 is included. Processing system 28 can be any suitable type of processing system, such as a system that includes microprocessor circuitry or similar circuitry. It should be understood that ASIC 26 or other system in which memory system 10 is included operates in response to a clock signal. As circuitry for generating and utilizing such a clock signal is well understood in the art, such circuitry is not shown or described in further detail. Memory controller 12 generates the above-referenced signals for performing the read and write operations in response to the clock signal. Signals are communicated among memory controller 12, memory devices 14, and processing system 28 via one or more busses 30. Although data is communicated in actuality via busses 30, logical data flow among memory controller 12 and memory banks 16, 18, 20, etc., is indicated in FIG. 1 by broken-line arrows.

A characteristic of processing system 28 is that it is a multiprocessing system in which at least one write process 32 and at least one read process 34 operate. On any given clock cycle, write process 32 is a process that attempts to perform a write operation to memory system 10, and read process 34 is a process that attempts to perform a read operation from memory system 10. Although in the exemplary embodiment write process 32 requests only write operations and read process 34 requests only read operations, it should be understood that in other embodiments a single process or other such entity can request both read and write operations at different times. Write and read processes 32 and 34 operate in parallel with each other, independently of each other, and without affecting each other.

Persons skilled in the art to which the invention relates will appreciate that write and read processes 32 and 34 are logical rather than physical entities and are shown in FIG. 1 as conceptually (indicated by the cloud symbol) residing in processing system 28 to facilitate description herein. In actuality, such processes arise from the operation of processing logic (e.g., microprocessor circuitry or similar circuitry) upon data. Although the details of processing system 28 are not shown for purposes of clarity because such processing systems are well understood in the art, processing system 28 can include memory in addition to such processing logic, and data representing aspects of write and read processes 32 and 34 can be stored in such memory and operated upon by the processing logic. In the context of some embodiments of the invention, processes may be referred to as ports. As described in further detail below, the invention allows write process 32 and read process 34 to perform a write operation and a read operation, respectively, during the same clock cycle, even though memory banks 16, 18, 20, etc., consist only of memory devices that are each capable of no more than a single write operation or, alternatively, a single read operation, during that clock cycle. In the exemplary embodiment, write process 32 can cause one write operation on every clock cycle (i.e., each of clock cycles N, N+1, N+2, etc.), and read process 34 can cause one read operation on every clock cycle.

In the exemplary embodiment, each of memory banks 16, 18, 20, etc., as well as cache memory 22 can be defined by a region or tile of memory that is some number (D) bits wide by some number (A) of words deep (where D and A are each greater than two). In accordance with ASIC design principles that are well understood in the art, an embedded dynamic random access memory (eDRAM) or embedded static RAM (eSRAM) macro can provide such a memory tile in ASIC 26. Each storage location in each of memory banks 16, 18, 20, etc., can be indicated by an index, ranging from zero to A-1. Parallel read and write operations are distributed across multiple memory banks 16, 18, 20, etc., as indicated by the horizontal bar 36 representing a read operation from one index and the horizontal bar 38 representing a write operation to another index. As each of memory banks 16, 18, 20, etc., operates independently of the others, parallel read and write operations are potentially hampered only in an instance in which the write operation and the read operation attempt to access the same one of memory banks 16, 18, 20, etc. As described below, embodiments of the present invention include features to avoid problems potentially posed by such a bank conflict.

Memory controller 12 includes memory logic 40 that controls operations including those described above with regard to performing write and read operations. Memory controller 12 also includes temporary data storage locations, including a read address tag storage location 42, a write address tag storage location 44, and a write address cache data storage location 46.

Figure 2:
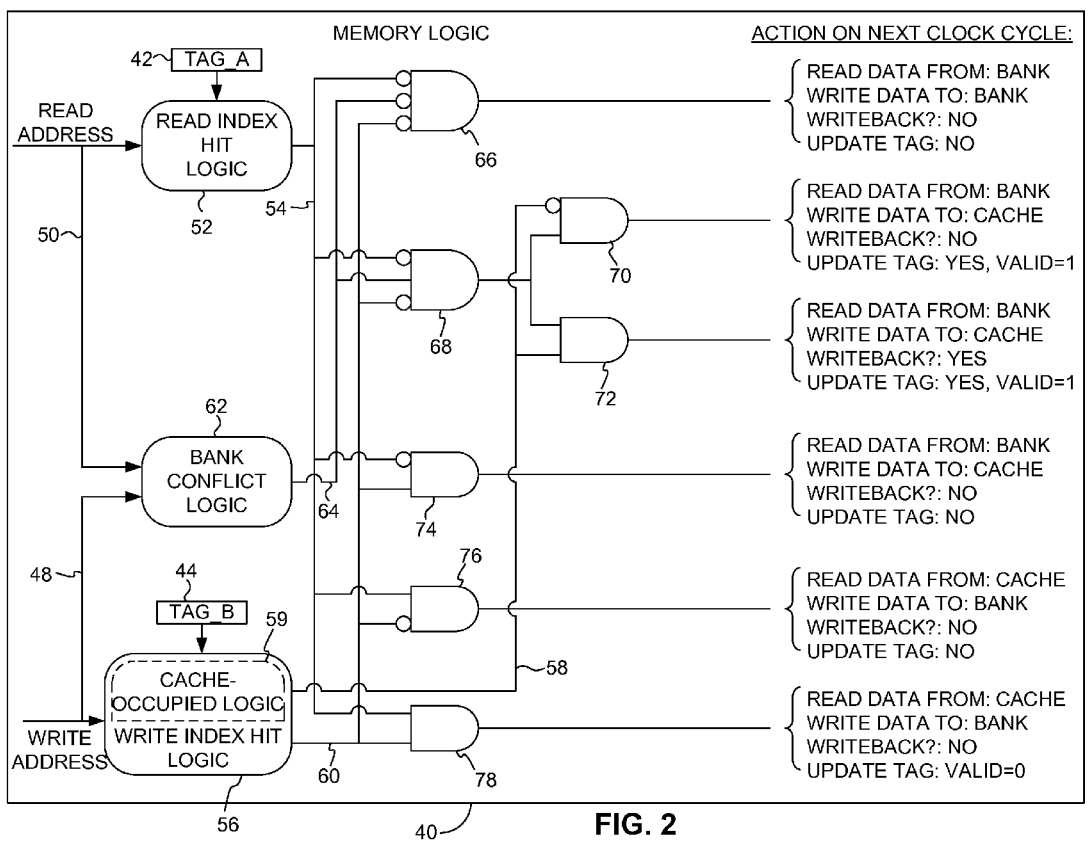
FIG. 2 is a diagram showing the memory logic portion of the memory system of FIG. 1.

Memory logic 40 is illustrated in further detail in FIG. 2. Memory logic 40 determines, during a clock cycle N, what action is to occur during clock cycle N+1, i.e., the next clock cycle. This timing or pipelining aspect is described in further detail below, following the description of memory logic 40. When write process 32 issues a request to write data to memory system 10, processing system 28 (FIG. 1) generates signals on busses 30 that include a write address 48 and write data (i.e., the data word to be stored in memory). Likewise, when read process 34 issues a request to read data from memory system 10, processing system 28 generates signals on busses 30 that include a read address 50. In a banked memory system such as that shown in FIG. 1, some of the address bits of write and read addresses 48 and 50, such as the most-significant several bits, which can be referred to as bank address bits, can indicate a bank in which the data is located, and the remaining address bits, which can be referred to as index address bits, can indicate the index within that bank at which the data is located. For example, in an embodiment in which there are eight banks, the three most significant bits or uppermost bits can indicate a bank to which a data word is to be written in the case of a write operation or from which a data word is to be read in the case of a read operation. Thus, horizontal bar 36 in FIG. 1 represents a write operation to a memory location at an index indicated by the index address bits in the one of memory banks 16, 18, 20, etc., that is indicated by the bank address bits. The one of memory banks 16, 18, 20, etc., that is written to can be referred to as the write bank. Likewise, horizontal bar 38 in FIG. 1 represents a read operation from a memory location at an index indicated by the index address bits in the one of memory banks 16, 18, 20, etc., that is indicated by the bank address bits. The one of memory banks 16, 18, 20, etc., that is read from can be referred to as the read bank. Although using the uppermost bits of an address to indicate a bank is suitable, in other embodiments other methods can be used, such as a hash algorithm that distributes data more evenly among the memory banks.

Cache memory 22 (FIG. 1) is used to avoid problems potentially posed by a bank conflict. As described above, cache memory 22 is the same size (DxA bits) as each of memory banks 16, 18, 20, etc. Accordingly, each storage location in cache memory 22 corresponds to one storage location in each of memory banks 16, 18, 20, etc., since the same index indicates the same relative storage location in cache memory 22 as it does in each of memory banks 16, 18, 20, etc. The data storage location at each index in cache memory 22 can be used to temporarily store a data word instead of storing the data word (not temporarily) at the same index in one of memory banks 16, 18, 20, etc. The one of memory banks 16, 18, 20, etc., at which a data word that is temporarily stored in cache memory 22 would be stored if it were not stored in cache memory 22 (i.e., not temporarily stored) can be referred to for convenience of description herein as the "native bank" or "natural bank" of that data word. A data word that is not temporarily stored in cache memory 22 is natively stored in one of memory banks 16, 18, 20, etc.

Tag memory 24 is used to store information that indicates the native bank of each data word stored in cache memory 22. A bank number can be stored at each index in tag memory 24 along with a "Valid" bit. The Valid bit stored at an index in tag memory 24 indicates whether a data word exists in a storage location in cache memory 22 at that same index. As described above, a data word exists in cache memory 22 instead of (i.e., temporarily) or in addition to existing in its native memory bank. For example: if the Valid bit at an index in tag memory 24 has a value of "1" then a data word exists (i.e., a "valid" data word) in a storage location in cache memory 22 at the same index; and if the Valid bit at an index in tag memory 24 has a value of "0" then a ("valid") data word does not exist in a storage location in cache memory 22 at that index. If the Valid bit at an index in tag memory 24 indicates that a valid data words exists at that index in cache memory 22, then the bank number stored at that index in tag memory 24 indicates the native bank of the data word stored at that index in cache memory 22.

As illustrated in FIG. 2, memory logic 40 includes read index hit logic 52 that determines whether a data word corresponding to read address 50 exists in cache memory 22. As described below in further detail, when read process 34 (FIG. 1) generates a read request to initiate a read operation, memory controller 12 (which receives the read request) reads the information stored at the index in tag memory 24 indicated by the index address bits of read address 50 and stores the information temporarily in read address tag storage location 42. Read index hit logic 52 determines if the Valid bit portion of this information indicates that a valid data word exists in cache memory 22 at that index. If a valid data word exists in the storage location in cache memory 22 at that index, then the storage location can be referred to as "occupied." Read index hit logic 52 can determine a read bank in response to read address 50 from the bank address bits of the read address 50. Read index hit logic 52 further determines if the bank number portion of the information read from tag memory 24 is the same as the read bank indicated by the bank address bits of read address 50. If the bank indicated by the bank number portion of the information read from tag memory 24 is the same as the read bank, and if the storage location in cache memory 22 is occupied, then there is a condition that can be referred to as a "hit" at that index. That is, in response to the read address and the information read from tag memory 22, read index hit logic 52 determines if there is a "hit," i.e., determines if a valid data word corresponding to the read address exists in cache memory 22. If read index hit logic 52 determines that there is a hit, read index hit logic 52 outputs a logic-"1" signal on a connection 54.

Memory logic 40 further includes write index hit logic 56 that determines whether a valid data word corresponding to write address 48 exists in cache memory 22. As described below in further detail, when write process 32 (FIG. 1) generates a write request to initiate a write operation, memory controller 12 (which receives the write request) reads the information stored at the index in tag memory 24 indicated by the index address bits of write address 50 and stores the information temporarily in write address tag storage location 44. Write index hit logic 56 determines if the Valid bit portion of this information indicates that a valid data word exists in cache memory 22 at that index, i.e., indicates that the storage location is occupied by valid data. If the Valid bit portion of the information indicates that the storage location in cache memory 22 is occupied by valid data, then write index hit logic 56 outputs a logic-"1" signal on a connection 58. (The cache-occupied logic 59 that is included in write index hit logic 56 for this purpose is shown separately for purposes of clarity. Similar cache-occupied logic is included in read index hit logic 52 but not shown because read index hit logic 52 does not output a similar cache-occupied signal.) Write index hit logic 56 can determine a write bank in response to write address 48 from the bank address bits of write address 48. Write index hit logic 56 further determines if the bank indicated by the bank number portion of the information read from tag memory 24 is the same as the write bank. If the bank indicated by the bank number portion of the information read from tag memory 24 is the same as the write bank, and if the storage location in cache memory 22 is occupied, then there is hit at that index. As described above with regard to read index hit logic 52, a hit means that there is a valid data word corresponding to the read address in cache memory 22. Stated another way, write index hit logic 56 determines if there is a hit in response to the write address and the information read from tag memory 22. If write index hit logic 56 determines that there is a hit, write index hit logic 56 outputs a logic-"1" signal on a connection 60.

Memory logic 40 further includes bank conflict logic 62 that determines if the read bank and the write bank are the same as each other. Such a condition can be referred to as a bank conflict. If a bank conflict exists, bank conflict logic 62 outputs a logic-"1" signal on a connection 64.

Cache memory 22 is used if there is a bank conflict. Cache memory 22 is also used if there is valid data in cache memory 22 that corresponds to write address 48, read address 50, or both. As described above, during a clock cycle N memory logic 40 determines what action or actions are to occur during the next clock cycle (N+1). The actions that occur include performing both a write operation upon a storage location corresponding to write address 48 and a read operation upon a storage location corresponding to read address 50. However, if there is a bank conflict, or if there is valid data in cache memory 22 that corresponds to write address 48 or read address 50, then one of either the write operation or read operation can be referred to as a memory access operation that accesses a storage location in cache memory 22. If there is neither a bank conflict nor valid data in cache memory 22 that corresponds to write address 48 or read address 50, then the write operation and read operation are performed upon storage locations in memory banks 16, 18, 20, etc., that correspond to write address 48 and read address 50, respectively. Logic that can be included in the exemplary embodiment to determine which of these actions is to occur includes, in addition to the above-described read index hit logic 52, write index hit logic 56, and bank conflict logic 62, additional logic circuitry comprising logical-AND gates 66, 68, 70, 72, 74, 76 and 78.

Logical-AND gate 66, which has three inverted inputs that are respectively connected to connections 54, 64 and 60, outputs a logic-"1" signal when the signal output by read index hit logic 52 is logic-"0", the signal output by write index hit logic 56 is logic-"0", and the signal output by bank conflict logic 62 is logic-"0". That is, logical-AND gate 66 outputs a logic-"1" signal when there is no valid data in cache memory 22 that corresponds to read address 50, there is no valid data in cache memory 22 that corresponds to write address 48, and there no bank conflict.

As indicated in FIG. 2, the actions that memory controller 12 performs during the next clock cycle under such conditions include performing a read operation from a storage location in one of memory banks 16, 18, 20, etc., that corresponds to read address 50 and performing a write operation to a storage location in one of memory banks 16, 18, 20, etc., that corresponds to write address 48. The data that is written in the write operation is the write data that memory controller 12 receives from write process 34. No other operations, such as performing a writeback operation (described below), or updating tag memory 24, need be performed under such conditions.

Logical-AND gate 68 has a first inverted input connected to connection 54, a first non-inverted input connected to connection 64, a second inverted input connected to connection 60, and an output connected to a first non-inverted input of logical-AND gate 70 and a first non-inverted input of logical-AND gate 72. A first inverted input of logical-AND gate 70 is connected to connection 58, and a second non-inverted input of logical-AND gate 72 is connected to connection 58.

In accordance with the above-described logic circuitry, logical-AND gate 70 outputs a logic-"1" signal when the signal output by read index hit logic 52 is logic-"0", the signal output by write index hit logic 56 is logic-"0", the signal output by bank conflict logic 62 is logic-"1", and the signal output by cache-occupied logic 59 is logic-"0". That is, logical-AND gate 70 outputs a logic-"1" signal when there is a bank conflict, there is no valid data in cache memory 22 that corresponds to read address 50, there is no valid data in cache memory 22 that corresponds to write address 48, and there is no valid data in the storage location in cache memory 22 corresponding to write address 48.

As indicated in FIG. 2, the actions that memory controller 12 performs during the next clock cycle under such conditions include performing a read operation from a storage location in one of memory banks 16, 18, 20, etc., that corresponds to read address 50 and performing a write operation to a storage location in cache memory 22 that corresponds to write address 48. The data that is written in the write operation is the write data that memory controller 12 receives from write process 34. A writeback operation (described below) is not performed. However, tag memory 24 is updated by storing the bank number corresponding to write address 48 and a corresponding Valid bit (e.g., storing a logic-"1") in respective storage locations at the same index as the index of the storage location in cache memory 22 to which the write operation is performed. This stored Valid bit indicates that a valid data word exists in the storage location in cache memory 22 at that index. The stored bank number indicates to which one of memory banks 16, 18, 20, etc., that data word corresponds or is native.

In accordance with the above-described logic circuitry, logical-AND gate 72 outputs a logic-"1" signal when the signal output by read index hit logic 52 is logic-"0", the signal output by write index hit logic 56 is logic-"0", the signal output by bank conflict logic 62 is logic-"1", and the signal output by cache-occupied logic 59 is logic-"1". That is, logical-AND gate 72 outputs a logic-"1" signal when there is a bank conflict, there is no valid data in cache memory 22 that corresponds to read address 50, there is no valid data in cache memory 22 that corresponds to write address 48, but there is valid data in the storage location in cache memory 22 corresponding to write address 48.

As indicated in FIG. 2, the actions that memory controller 12 performs during the next clock cycle under such conditions include performing a read operation from a storage location in one of memory banks 16, 18, 20, etc., that corresponds to read address 50, performing a write operation to a storage location in cache memory 22 that corresponds to write address 48, performing a writeback operation, and updating tag memory 24. A writeback operation is performed because there is valid data in the storage location in cache memory corresponding to write address 48, i.e., the storage location is already occupied and therefore is not available for temporary storage.

To prepare for the possibility of a condition requiring a writeback operation, memory controller 12 reads (or "pre-reads") the data word at the storage location in cache memory 22 corresponding to write address 48 on every clock cycle (N) and temporarily stores the data word in write address cache data storage location 46 (FIG. 1). Similarly, memory controller 12 pre-reads the bank number information at the storage location in tag memory 24 corresponding to write address 48 on every clock cycle (N) and temporarily stores the bank number information in write address tag storage location 44. Then, on the next clock cycle (N+1), if the output of logical-AND gate 72 indicates that a writeback operation is to be performed, memory controller 12 both stores the write data that it receives from write process 34 in a storage location in cache memory 22 corresponding to write address 48 and copies the data word temporarily stored in write address cache data storage location 46 to a storage location in one of memory banks 16, 18, 20, etc., corresponding to the bank number that was temporarily stored in write address tag storage location 44. Memory controller 12 also updates tag memory 24 by storing the bank number corresponding to write address 48 and a corresponding Valid bit (e.g., storing a logic-"1") in respective storage locations at the same index as the index of the storage location in cache memory 22 to which the write operation is performed. This stored Valid bit indicates that a valid data word exists in the storage location in cache memory 22 at that index. The stored bank number indicates to which one of memory banks 16, 18, 20, etc., that data word corresponds or is native.

Logical-AND gate 74, which has an inverted input connected to connection 54 and a non-inverted input connected to connection 60, outputs a logic-"1" signal when the signal output by read index hit logic 52 is logic-"0" and the output of write index hit logic 56 is logic-"1". That is, Logical-AND gate 74 outputs a logic-"1" signal when there is no valid data in cache memory 22 that corresponds to read address 50 and there is valid data in cache memory 22 that corresponds to write address 48. Whether there is or is not a bank conflict is irrelevant (i.e., a "don't care" condition in digital logic parlance) because under these conditions the contents of the relevant memory location in cache memory 22 are unchanged.

As indicated in FIG. 2, the actions that memory controller 12 performs during the next clock cycle under such conditions include performing a read operation from a storage location in one of memory banks 16, 18, 20, etc., that corresponds to read address 50 and performing a write operation to a storage location in cache memory 22 that corresponds to write address 48. The data that is written in the write operation is the write data that memory controller 12 receives from write process 34. No writeback operation or update of tag memory 24 need be performed under such conditions.

Logical-AND gate 76, which has a non-inverted input connected to connection 54 and an inverted input connected to connection 60, outputs a logic-"1" signal when the signal output by read index hit logic 52 is logic-"1" and the output of write index hit logic 56 is logic-"0". That is, logical-AND gate 76 outputs a logic-"1" signal when there is valid data in cache memory 22 that corresponds to read address 50 and there is no valid data in cache memory 22 that corresponds to write address 48. Whether there is or is not a bank conflict is irrelevant because under these conditions the contents of the relevant memory location in cache memory 22 are unchanged.

As indicated in FIG. 2, the actions that memory controller 12 performs during the next clock cycle under such conditions include performing a read operation from a storage location in cache memory 22 that corresponds to read address 50 and performing a write operation to a storage location in one of memory banks 16, 18, 20, etc., that corresponds to write address 48. The data that is written in the write operation is the write data that memory controller 12 receives from write process 34. No writeback operation or update of tag memory 24 need be performed under such conditions.

Logical-AND gate 78, which has a first non-inverted input connected to connection 54 and a second non-inverted input connected to connection 60, outputs a logic-"1" signal when the signal output by read index hit logic 52 is logic-"1" and the output of write index hit logic 56 is logic-"1". That is, Logical-AND gate 76 outputs a logic-"1" signal when there is valid data in cache memory 22 that corresponds to read address 50 and there is also valid data in cache memory 22 that corresponds to write address 48. Whether there is or is not a bank conflict is irrelevant because under these conditions the contents of the relevant memory location in cache memory 22 are unchanged.

As indicated in FIG. 2, the actions that memory controller 12 performs during the next clock cycle under such conditions include performing a read operation from a storage location in cache memory 22 that corresponds to read address 50 and performing a write operation to a storage location in one of memory banks 16, 18, 20, etc., that corresponds to write address 48. The data that is written in the write operation is the write data that memory controller 12 receives from write process 34. No writeback operation need be performed. However, memory controller 12 updates tag memory 24 by clearing the Valid bit (e.g., storing a logic-"0") in the storage location at the same index as the index of the storage location in cache memory 22 to which the write operation is performed. This logic-"0" Valid bit or "Invalid" bit indicates that a valid data word does not exist in the storage location in cache memory 22 at that index.

The logic circuitry of memory logic 40 is summarized in truth table form in FIG. 3. It can be noted that cache memory 22 is employed to avoid problems arising from a bank conflict. That is, under all logic conditions set forth in the truth table, a memory access operation, i.e., either the write operation under some logic conditions or the read operation under other logic conditions, is performed upon a storage location in either cache memory 22 or one of memory banks 16, 18, 20, etc. However, the memory access operation is performed upon a storage location in cache memory 22 only if either a bank conflict exists or data corresponding to one of read address 50 and write address 48 exists in cache memory 22.

The relative timing and pipelining of the above-described operations or actions is illustrated in FIG. 4. As described above, in the exemplary embodiment write process 32 and read process 34 initiate a write operation and a read operation, respectively, on every clock cycle during a chain of two or more successive clock cycles. Three exemplary, successive clock cycles N, N+1 and N+2 are shown in FIG. 4.

During each of these clock cycles, such as clock cycle N, memory controller 12 (FIG. 1) reads tag information from a storage location in tag memory 24 corresponding to write address 48 and read address 50 (FIG. 2) and temporarily stores the tag information in write address tag storage location 44 and read address tag storage location 42. Memory controller 12 also pre-reads a data word from a storage location in cache memory 22 corresponding to write address 48 and temporarily stores the data word in write address cache data storage location 46. During the same clock cycle as that in which memory controller 12 performs the foregoing operations, such as clock cycle N, memory logic 40 (FIG. 2) of memory controller 12 operates upon the tag information as well as write and read addresses 48 and 50 to determine what actions are to occur on the next clock cycle N+1.

During the next clock cycle, such as clock cycle N+1 relative to actions determined by memory logic 40 during clock cycle N, memory controller 12 performs a read operation and a write operation. This clock cycle can be referred to for purposes of describing these memory access operations as a memory access clock cycle. Memory controller 12 performs the read operation upon either cache memory 22 or one of memory banks 16, 18, 20, etc., depending upon the above-described outputs of memory logic 40. Likewise, memory controller 12 performs the write operation upon either cache memory 22 or one of memory banks 16, 18, 20, etc., depending upon the above-described outputs of memory logic 40. As also described above, under some conditions memory logic 40 outputs an indication to perform a writeback operation, in which case memory controller 12 also performs a writeback operation during this next clock cycle N+1. As also described above, under some conditions memory logic 40 outputs an indication to update tag memory 24, in which case memory controller 12 also updates tag memory 24 by storing a value for the Valid bit (either a logic-"0" or logic-"1") and, in some cases, an updated bank number, in the relevant storage locations in tag memory 24 during this next clock cycle N+1. Note that during each successive clock cycle in the chain of clock cycles, such as during this next clock cycle N+1, memory controller 12 also performs the actions described above with regard to clock cycle N, thereby operating in a pipelined manner. As shown in FIG. 4 occurring during clock cycle N+2, after a memory latency period, such as one clock cycle, the data that memory controller 12 reads from cache memory 22 or one of memory banks 16, 18, 20, etc., during clock cycle N+1 as described above becomes available for read process 34 to transfer out of memory system 10 via busses 30. A memory latency of one clock cycle is illustrated in FIG. 4, but in other embodiments the memory latency can be one, two, or more clock cycles.

Figure 5:
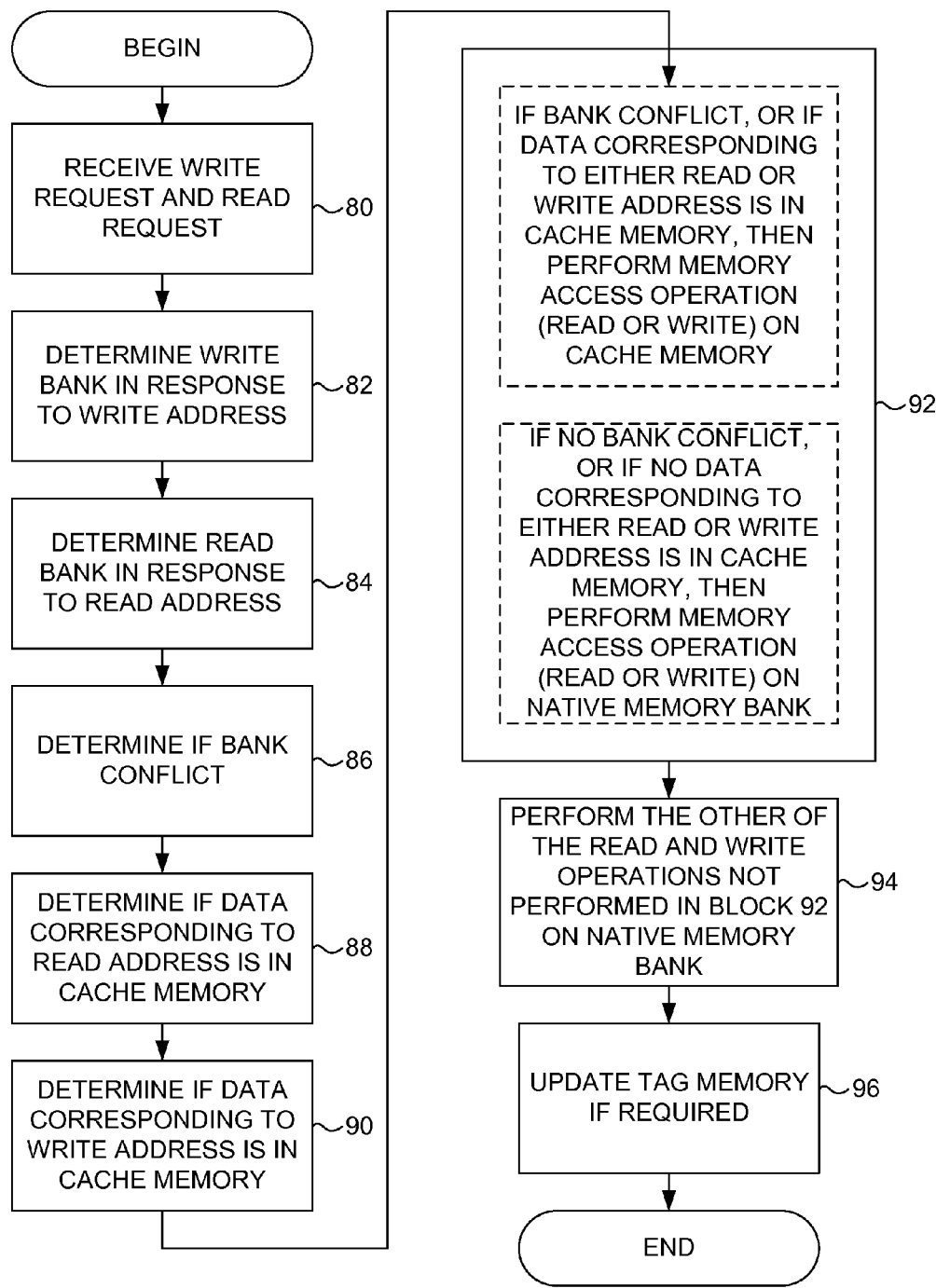
FIG. 5 is a flow diagram illustrating an exemplary method of operation of the memory system of FIG. 1.

The operation of memory system 10 described above can be summarized with reference to the diagram of FIG. 5. Blocks 80, 82, 84, 86, 88, 90, 92, 94 and 96 represent the above-described operations or actions and need not be performed in any sequence that may be implied by their order in FIG. 5. Indeed, the order shown in FIG. 5 is intended only for purposes of illustration. The operations indicated by blocks blocks 80, 82, 84, 86, 88, 90, 92, 94 and 96 can be performed in any suitable order except as may be indicated by the descriptions above.

As indicated by block 80, memory controller 12 (FIG. 1) receives both a write request and a read request from write process 32 and read process 34, respectively, during each of a number of successive clock cycles. The write request includes a write address and write data, and the read request includes a read address. As indicated by block 82, memory logic 40 of memory controller 12 determines a write bank in response to the write address. As indicated by block 84, memory logic 40 of memory controller 12 determines a read bank in response to the read address. As indicated by block 86, memory logic 40 of memory controller 12 further determines if a bank conflict exists. As indicated by block 88, memory logic 40 of memory controller 12 also determines in response to the read address and information read from tag memory 24 if valid data corresponding to the read address exists in cache memory 22. Similarly, as indicated by block 90, memory logic 40 of memory controller 12 determines in response to the write address and information read from tag memory 24 if data corresponding to the write address exists in cache memory 22.

As indicated by block 92, on the next clock cycle or after the above-described operations, memory controller 12 performs a memory access operation comprising one of a write operation and a read operation upon a storage location corresponding to one of the write address and the read address, respectively. The memory access operation is performed upon a storage location in cache memory 22 if either a bank conflict exists or data corresponding to one of the read address and write address exists in cache memory 22. The memory access operation is performed upon the native bank, i.e., one of memory banks 16, 18, 20, etc., if no bank conflict exists and there is no data corresponding to either the read address or write address in cache memory 22.

As indicated by block 94, memory controller 12 performs the other of the read and write operations, i.e., the operation is that not the "memory access operation" described above with regard to block 92. Note that both a read operation and write operation are performed in response to the read request and write request, respectively, during each ("memory access") clock cycle in the chain of successive clock cycles. Under conditions in which the read operation is the memory access operation that is performed upon cache memory 22 during the memory access clock cycle, block 94 indicates that a write operation is performed upon one of memory banks 16, 18, 20, etc., during the memory access clock cycle. Under conditions in which the write operation is the memory access operation performed upon cache memory 22 during the memory access clock cycle, block 94 indicates that a read operation is performed upon one of memory banks 16, 18, 20, etc., during the memory access clock cycle.

As indicated by block 96, under certain conditions described above, memory controller 12 also updates tag memory 24. More specifically, if a write operation is performed upon the storage location in cache memory 22 corresponding to the write address and if it is determined that data corresponding to the write address did not exist in cache memory 22 prior to the write operation, then tag memory 24 is updated with a Valid bit to indicate whether valid data exists in a storage location in cache memory 22 corresponding to the write address and updated with bank number information to indicate which bank that storage location represents.

Note that blocks 80-96 broadly describe the overall operation of memory system 10, and that other operations that can be included, such as operations relating to the above-described writeback operation, are not shown in FIG. 5. It can be noted, however, that the writeback operation is not an additional operation but rather a special case of the memory access operation indicated by block 92. That is, in a writeback operation, the memory access operation (block 92) is a write operation performed upon a storage location in cache memory 22, but there is an additional write operation that transfers a data word previously held in cache memory 22 back into its native memory bank.

One or more illustrative embodiments of the invention have been described above. However, it is to be understood that the invention is defined by the appended claims and is not limited to the specific embodiments described.

What is claimed is:

1. A method for operating a memory system, the memory system comprising a plurality of memory banks of one or more single-port memory devices, a cache memory, and a tag memory, each memory bank having a plurality of storage locations for storing data and being accessible for no more than one memory access operation during a clock cycle, the cache memory having a plurality of storage locations corresponding to the storage locations in each of the plurality of memory banks, the method comprising:

receiving a write request and a read request during each of a plurality of successive clock cycles, the write request including a write address and write data, the read request including a read address;

during a clock cycle immediately preceding a memory access clock cycle, determining a write bank in response to the write address;

during the clock cycle immediately preceding the memory access clock cycle, determining a read bank in response to the read address;

during the clock cycle immediately preceding the memory access clock cycle, determining if a bank conflict exists, a bank conflict existing if the read bank and the write bank are the same as each other;

during the clock cycle immediately preceding the memory access clock cycle, determining in response to the read address and the tag memory if data corresponding to the read address exists in the cache memory;

during the clock cycle immediately preceding the memory access clock cycle, determining in response to the write address and the tag memory if data corresponding to the write address exists in the cache memory;

performing a memory access operation comprising one of a write operation and a read operation upon a storage location corresponding to one of the write address and the read address, the memory access operation being performed upon a storage location in the cache memory if either a bank conflict exists or data corresponding to one of the read address and write address exists in the cache memory, wherein performing a memory access operation occurs during the memory access clock cycle; and updating the tag memory to indicate data exists in a storage location in the cache memory corresponding to the write address if a write operation is performed upon the storage location in the cache memory corresponding to the write address and if it is determined that data corresponding to the write address does not exist in the cache memory prior to the write operation;

wherein a write operation is performed upon a storage location corresponding to the write address during the memory access clock cycle and a read operation is performed upon a storage location corresponding to the read address during the memory access clock cycle; and wherein if data corresponding to the read address exists in the cache memory and if data corresponding to the write address exists in the cache memory then the read operation is performed upon a storage location in the cache memory corresponding to the read address during the memory access clock cycle and the write operation is performed upon a storage location in the write bank corresponding to the write address during the memory access clock cycle.

2. The method claimed in claim 1, wherein if a bank conflict does not exist and if data corresponding to the read address does not exist in the cache memory and if data corresponding to the write address does not exist in the cache memory then the read operation is performed upon a storage location in the read bank corresponding to the read address during the memory access clock cycle and the write operation is performed upon a storage location in the write bank corresponding to the write address during the memory access clock cycle.

3. The method claimed in claim 1, further comprising determining in response to the tag memory if a storage location in the cache memory corresponding to the write address is occupied by valid data, and wherein if a bank conflict exists and if data corresponding to the read address does not exist in the cache memory and if data corresponding to the write address does not exist in the cache memory and if the storage location in the cache memory corresponding to the write address is not occupied by valid data then the read operation is performed upon a storage location in the read bank corresponding to the read address during the memory access clock cycle and the write operation is performed upon a storage location in the cache memory corresponding to the write address during the memory access clock cycle.

4. The method claimed in claim 1, further comprising determining in response to the tag memory if a storage location in the cache memory corresponding to the write address is occupied by valid data, and wherein if a bank conflict exists and if data corresponding to the read address does not exist in the cache memory and if data corresponding to the write address does not exist in the cache memory and if a storage location in the cache memory corresponding to the write address is occupied by valid data then the read operation is performed upon a storage location in the read bank corresponding to the read address during the memory access clock cycle and the write operation is performed upon a storage location in the cache memory corresponding to the write address during the memory access clock cycle, wherein, before the write operation is performed upon a storage location in the cache memory, data corresponding to the address other than the read address and the write address is copied from the cache memory to a storage location in the write bank corresponding to the write address.

5. The method claimed in claim 1, wherein if data corresponding to the read address does not exist in the cache memory and if data corresponding to the write address exists in the cache memory then the read operation is performed upon a storage location in the read bank corresponding to the read address during the memory access clock cycle and the write operation is performed upon a storage location in the cache memory corresponding to the write address during the memory access clock cycle.

6. The method claimed in claim 1, wherein if data corresponding to the read address exists in the cache memory and if data corresponding to the write address does not exist in the cache memory then the read operation is performed upon a storage location in the cache memory corresponding to the read address during the memory access clock cycle and the write operation is performed upon a storage location in the write bank corresponding to the write address during the memory access clock cycle.

7. The method claimed in claim 1, further comprising updating the tag memory to indicate data does not exist in the storage location in the cache memory corresponding to the write address if it is determined prior to the memory access cycle that data corresponding to the read address exists in the cache memory and data corresponding to the write address exists in the cache memory.

8. A memory system, comprising:

a plurality of memory banks of one or more single-port memory devices, each memory bank having a plurality of storage locations for storing data, each memory bank being accessible for no more than one memory access operation during a clock cycle;

a cache memory having a plurality of storage locations corresponding to the storage locations in each of the plurality of memory banks;

a tag memory having a plurality of storage locations corresponding to the storage locations of the cache memory; and a memory controller, the memory controller receiving a write request and a read request during each of a plurality of successive clock cycles, the write request including a write address and write data, the read request including a read address, the memory controller determining a write bank in response to the write address and a read bank in response to the read address during a clock cycle immediately preceding a memory access clock cycle, the memory controller determining during the clock cycle immediately preceding the memory access clock cycle if a bank conflict exists, a bank conflict existing if the read bank and the write bank are the same as each other, the memory controller determining in response to the read address and the tag memory if data corresponding to the read address exists in the cache memory during the clock cycle immediately preceding the memory access clock cycle, the memory logic determining in response to the write address and the tag memory if data corresponding to the write address exists in the cache memory during the clock cycle immediately preceding the memory access clock cycle, the memory controller performing a memory access operation comprising one of a write operation and a read operation upon a storage location corresponding to one of the write address and the read address, the memory access operation being performed upon a storage location in the cache memory if either a bank conflict exists or data corresponding to one of the read address and write address exists in the cache memory, wherein performing a memory access operation occurs during the memory access clock cycle, and the memory controller updating the tag memory to indicate data exists in a storage location in the cache memory corresponding to the write address if a write operation is performed upon the storage location in the cache memory corresponding to the write address and if it is determined that data corresponding to the write address does not exist in the cache memory prior to the write operation, the memory controller generating memory control signals to perform a write operation upon a storage location corresponding to the write address during the memory access clock cycle and to perform a read operation upon a storage location corresponding to the read address during the memory access clock cycle;

wherein if data corresponding to the read address exists in the cache memory and if data corresponding to the write address exists in the cache memory then the read operation is performed upon a storage location in the cache memory corresponding to the read address during the memory access clock cycle and the write operation is performed upon a storage location in the write bank corresponding to the write address during the memory access clock cycle.

9. The memory system claimed in claim 8, wherein if a bank conflict does not exist and if data corresponding to the read address does not exist in the cache memory and if data corresponding to the write address does not exist in the cache memory then the memory controller performs the read operation upon a storage location in the read bank corresponding to the read address during the memory access clock cycle and performs the write operation upon a storage location in the write bank corresponding to the write address during the memory access clock cycle.

10. The memory system claimed in claim 8, wherein the memory controller further determines, in response to the tag memory, if a storage location in the cache memory corresponding to the write address is occupied by valid data, and wherein if a bank conflict exists and if data corresponding to the read address does not exist in the cache memory and if data corresponding to the write address does not exist in the cache memory and if a storage location in the cache memory corresponding to the write address is not occupied by valid data then the memory controller performs the read operation upon a storage location in the read bank corresponding to the read address during the memory access clock cycle and performs the write operation upon a storage location in the cache memory corresponding to the write address during the memory access clock cycle.

11. The memory system claimed in claim 8, wherein the memory controller further determines, in response to the tag memory, if a storage location in the cache memory corresponding to the write address is occupied by valid data, and wherein if a bank conflict exists and if data corresponding to the read address does not exist in the cache memory and if data corresponding to the write address does not exist in the cache memory and if a storage location in the cache memory corresponding to the write address is occupied by valid data then the memory controller performs the read operation upon a storage location in the read bank corresponding to the read address during the memory access clock cycle and performs the write operation upon a storage location in the cache memory corresponding to the write address during the memory access clock cycle, and wherein, before the memory controller performs the write operation upon a storage location in the cache memory, the memory controller copies data corresponding to the address other than the read address and the write address from the cache memory to a storage location in the write bank corresponding to the write address.

12. The memory system claimed in claim 8, wherein if data corresponding to the read address does not exist in the cache memory and if data corresponding to the write address exists in the cache memory then the memory controller performs the read operation upon a storage location in the read bank corresponding to the read address during the memory access clock cycle and performs the write operation upon a storage location in the cache memory corresponding to the write address during the memory access clock cycle.

13. The memory system claimed in claim 8, wherein if data corresponding to the read address exists in the cache memory and if data corresponding to the write address does not exist in the cache memory then the memory controller performs the read operation upon a storage location in the cache memory corresponding to the read address during the memory access clock cycle and performs the write operation upon a storage location in the write bank corresponding to the write address during the memory access clock cycle.

14. The memory system claimed in claim 8, further comprising the memory controller updating the tag memory to indicate data does not exist in the storage location in the cache memory corresponding to the write address if the memory controller determines prior to the memory access cycle that data corresponding to the read address exists in the cache memory and data corresponding to the write address exists in the cache memory.

15. An integrated circuit chip, comprising a substrate having a microelectronic memory system formed thereon, comprising:

a plurality of memory banks of one or more single-port memory devices formed on the substrate, each memory bank having a plurality of storage locations for storing data, each memory bank being accessible for no more than one memory access operation during a clock cycle;

a cache memory formed on the substrate, the cache memory having a plurality of storage locations corresponding to the storage locations in each of the plurality of memory banks;

a tag memory formed on the substrate, the tag memory having a plurality of storage locations corresponding to the storage locations of the cache memory; and a memory controller formed on the substrate, the memory controller receiving a write request and a read request during each of a plurality of successive clock cycles, the write request including a write address and write data, the read request including a read address, the memory controller determining a write bank in response to the write address and a read bank in response to the read address during a clock cycle immediately preceding a memory access clock cycle, the memory controller determining during the clock cycle immediately preceding the memory access clock cycle if a bank conflict exists, a bank conflict existing if the read bank and the write bank are the same as each other, the memory controller determining in response to the read address and the tag memory if data corresponding to the read address exists in the cache memory during the clock cycle immediately preceding the memory access clock cycle, the memory logic determining in response to the write address and the tag memory if data corresponding to the write address exists in the cache memory during the clock cycle immediately preceding the memory access clock cycle, the memory controller performing a memory access operation comprising one of a write operation and a read operation upon a storage location corresponding to one of the write address and the read address, the memory access operation being performed upon a storage location in the cache memory if either a bank conflict exists or data corresponding to one of the read address and write address exists in the cache memory, wherein performing a memory access operation occurs during a memory access clock cycle, and the memory controller updating the tag memory to indicate data exists in a storage location in the cache memory corresponding to the write address if a write operation is performed upon the storage location in the cache memory corresponding to the write address and if it is determined that data corresponding to the write address does not exist in the cache memory prior to the write operation, the memory controller generating memory control signals to perform a write operation upon a storage location corresponding to the write address during the memory access clock cycle and to perform a read operation upon a storage location corresponding to the read address during the memory access clock cycle;

wherein if data corresponding to the read address exists in the cache memory and if data corresponding to the write address exists in the cache memory then the read operation is performed upon a storage location in the cache memory corresponding to the read address during the memory access clock cycle and the write operation is performed upon a storage location in the write bank corresponding to the write address during the memory access clock cycle.

* * * * *